United States Patent
Yang et al.

(10) Patent No.: US 9,733,386 B2
(45) Date of Patent: Aug. 15, 2017

(54) SCINTILLATOR INCLUDING AN ELPASOLITE SCINTILLATOR COMPOUND AND APPARATUS INCLUDING THE SCINTILLATOR

(71) Applicant: SAINT-GOBAIN CERAMICS & PLASTICS, INC., Worcester, MA (US)

(72) Inventors: Kan Yang, Solon, OH (US); Peter R. Menge, Novelty, OH (US); Vladimir Ouspenski, Saint-Pierre-les-Nemours (FR); Julien Lejay, Rueil Malmaison (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/885,784

(22) Filed: Oct. 16, 2015

(65) Prior Publication Data

US 2016/0124111 A1     May 5, 2016

Related U.S. Application Data (60) Provisional application No. 62/072,317, filed on Oct. 29, 2014.

(51) Int. Cl.
  *G01V 5/00*  (2006.01)
  *G01V 5/04*  (2006.01)
  (Continued)

(52) U.S. Cl.
  CPC ............ *G01V 5/06* (2013.01); *C09K 11/7766* (2013.01); *G01T 1/2023* (2013.01); *G01T 3/06* (2013.01)

(58) Field of Classification Search
  CPC ...... G01V 5/06; C09K 11/7766; G01T 1/2018
  (Continued)

(56) References Cited

U.S. PATENT DOCUMENTS 7,655,919 B1   2/2010   Shah et al.
7,977,645 B1   7/2011   Shah et al.
(Continued)

FOREIGN PATENT DOCUMENTS

WO    2013-059394 A1    4/2013
WO    2014-167262 A1    10/2014

OTHER PUBLICATIONS

Menge et al. ("Behavior of Cs2LiYCl6:Ce Scintillator up to 175oC", IEEE Nuclear Science Symposium Conference Record, pp. 1598-1601, Nov. 4, 2011, hereinafter Menge A).*
(Continued)

*Primary Examiner* — David Porta
*Assistant Examiner* — Abra Fein
(74) *Attorney, Agent, or Firm* — Abel Law Group, LLP; Robert N. Young (57) ABSTRACT

A scintillator can include an elpasolite scintillator compound. The scintillator can be doped with a Group 2 element, and may also include an activator. The scintillator has an improved core valence luminescence at room temperature as compared to a corresponding elpasolite scintillator compound without the Group 2 dopant. The elpasolite scintillator compound can have significant core valance luminescence at a temperature higher than 125° C. In a particular embodiment, the elpasolite scintillator compound can include Cl and may or may not also include another halide, such as Br or I. The scintillator can be part of an apparatus that detects gamma radiation and neutrons and may allow a relatively simpler pulse discrimination technique to be used to a higher temperature, such as 125° C. to 150° C. before a relatively more complex pulse discrimination technique would be used.

14 Claims, 7 Drawing Sheets

(51) Int. Cl.
*G01V 5/06* (2006.01)
*C09K 11/77* (2006.01)
*G01T 1/202* (2006.01)
*G01T 3/06* (2006.01)

(58) Field of Classification Search
USPC .......................................................... 250/261
See application file for complete search history.

(56) References Cited

U.S. PATENT DOCUMENTS

| | | | |
|---|---|---|---|
| 8,153,982 B1 | 4/2012 | Shah et al. | |
| 8,575,553 B1 | 11/2013 | Shah et al. | |
| 2003/0193040 A1* | 10/2003 | Venkataramani | C09K 11/7718 252/301.4 F |
| 2007/0029493 A1 | 2/2007 | Kniss et al. | |
| 2011/0024634 A1* | 2/2011 | Shah | G01T 1/202 250/362 |
| 2011/0121186 A1 | 5/2011 | Shah et al. | |
| 2011/0272585 A1* | 11/2011 | Yang | C09K 11/772 250/362 |
| 2013/0020488 A1* | 1/2013 | Flamanc | G01T 1/2018 250/362 |
| 2013/0240742 A1* | 9/2013 | Menge | G01T 1/202 250/367 |
| 2014/0319330 A1* | 10/2014 | Berheide | G01T 3/06 250/269.5 |
| 2015/0241594 A1* | 8/2015 | Yang | G01V 5/045 250/262 |
| 2016/0103232 A1 | 4/2016 | Ouspenski et al. | |

OTHER PUBLICATIONS

International Search Report for PCT Application No. PCT/US2015/056072, dated Jan. 26, 2016, 1 page.

* cited by examiner

SCINTILLATOR INCLUDING AN ELPASOLITE SCINTILLATOR COMPOUND AND APPARATUS INCLUDING THE SCINTILLATOR

CROSS-REFERENCE TO RELATED APPLICATIONS

The present application claims priority under 35 U.S.C. §119(e) to U.S. Provisional Patent Application No. 62/072,317, filed Oct. 29, 2014, entitled "SCINTILLATOR INCLUDING AN ELPASOLITE SCINTILLATOR COMPOUND AND APPARATUS INCLUDING THE SCINTILLATOR," naming as inventors Kan Yang et al., which application is assigned to the current assignee hereof and is incorporated by reference herein in its entirety.

FIELD OF THE DISCLOSURE

The present disclosure is directed to scintillators including elpasolite scintillator compounds and, apparatuses including such scintillators.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to ionizing radiation, the scintillator material absorbs energy of incoming radiation and scintillates, remitting the absorbed energy in the form of photons. Some scintillators are used to detect more than one type of radiation, such as gamma radiation and neutrons. Such scintillators may be limited in a temperature range over which discrimination between the different types of radiation can effectively occur.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, core valence luminescence is no longer significant when a relatively simple pulse discrimination technique cannot be used to discriminate between neutrons and gamma radiation.

The term "corresponding elpasolite scintillator composition" is intended to mean a scintillator compound where a Group 2 dopant is removed and replaced by a rare element that is within the scintillator compound with the Group 2 element. For example, $Cs_2LiY_{0.98}Ce_{0.02}Cl_6$ is a corresponding elpasolite scintillator composition to $Cs_2LiY_{0.968}Ce_{0.02}Sr_{0.012}Cl_6$.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillator can include an elpasolite scintillator compound having core valence luminescence. In an embodiment, the elpasolite scintillator compound can be doped with a Group 2 element. The Group 2 dopant can help to improve core valance luminescence as compared to a corresponding elpasolite scintillator compound without a Group 2 dopant. In another embodiment, the elpasolite scintillator compound can have core valence luminescence at a temperature higher than 125° C. and as high as 150° C. In an application, the scintillator can be used in an apparatus that normally operates over a large temperature range, for example, greater than 80° C. Thus, a relatively simpler pulse discrimination technique may be used over a larger temperature range or a higher temperature before a relatively more complicated pulse discrimination is needed. The scintillator may be used in an apparatus that can be part of a down hole tool used in drilling or well logging or may be used as a port-of-entry detector.

Figure 1:
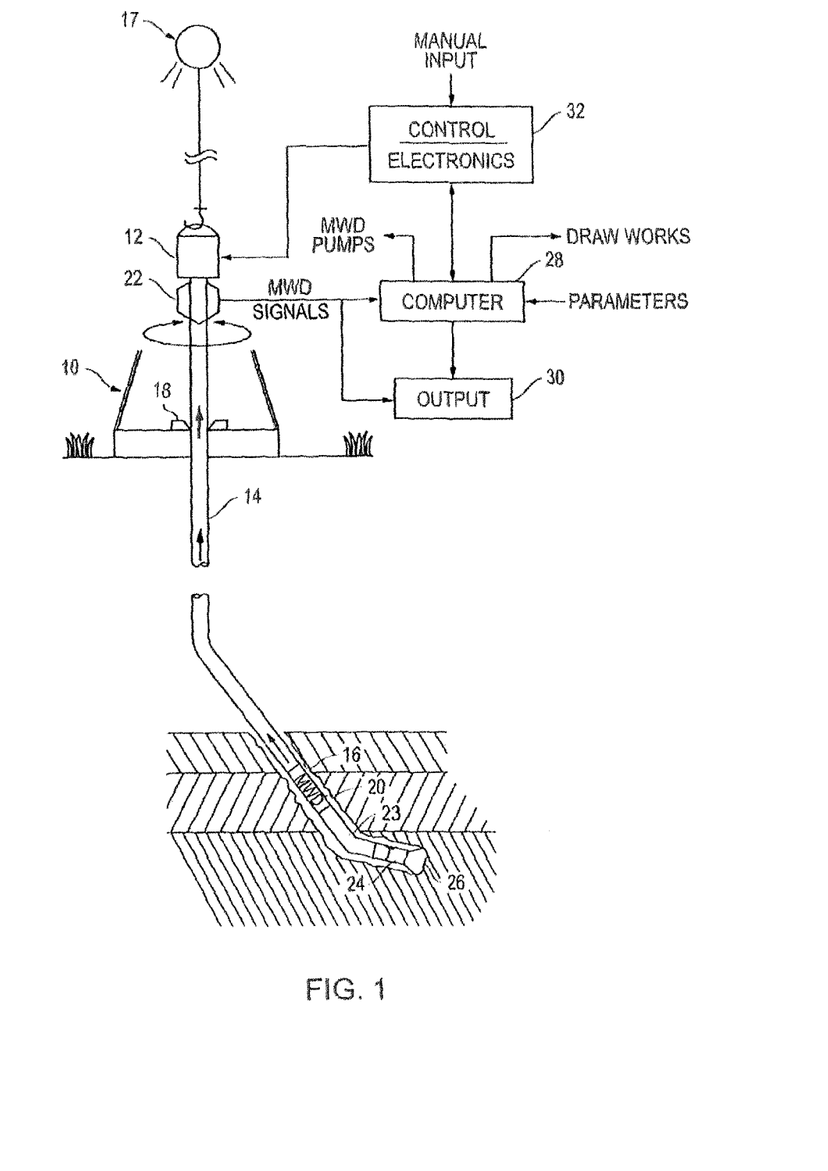
FIG. 1 includes a depiction of a drilling apparatus.

FIG. 1 includes a depiction of a drilling apparatus 10 includes a top drive 12 connected to an upper end of a drill string 14 that is suspended within a well bore 16 by a draw works 17. A rotary table, including pipe slips, 18 can be used to maintain proper drill string orientation in connection with or in place of the top drive 12. A downhole telemetry measurement and transmission device 20, commonly referred to as a measurement-while-drilling (MWD) device, is part of a downhole tool that is connected to a lower end of the drill string 14. The MWD device transmits drilling-associated parameters to the surface by mud pulse or electromagnetic transmission. These signals are received at the surface by a data receiving device 22. The downhole tool includes a bent section 23, a downhole motor 24, and a drill bit 26. The bent section 23 is adjacent the MWD device for assistance in drilling an inclined well bore. The downhole motor 24, such as a positive-displacement-motor (PDM) or downhole turbine, powers the drill bit 26 and is at the distal end of the downhole tool.

The downhole signals received by the data reception device 22 are provided to a computer 28, an output device 30, or both. The computer 28 can be located at the well site or remotely linked to the well site. An analyzer device can be part of the computer 28 or may be located within the downhole tool near the MWD device 20. The computer 28 and analyzer device can include a processor that can receive input from a user. The signals are also sent to an output device 30, which can be a display device, a hard copy log printing device, a gauge, a visual audial alarm, or any combination thereof. The computer 28 is operatively connected to controls of the draw works 17 and to control electronics 32 associated with the top drive 12 and the rotary table 18 to control the rotation of the drill string and drill bit. The computer 28 may also be coupled to a control mechanism associated with the drilling apparatus's mud pumps to control the rotation of the drill bit. The control electronics 32 can also receive manual input, such as a drill operator.

Figure 2:
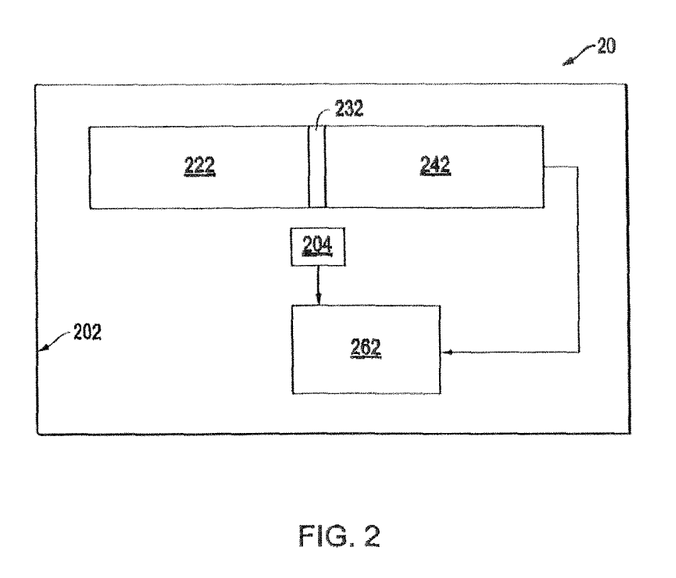
FIG. 2 includes a depiction of a radiation detection apparatus within the drilling apparatus.

FIG. 2 illustrates a depiction of a portion of the MWD device 20 within the downhole tool 16. The MWD device 20 includes a housing 202, a temperature sensor 204, a scintillator 222, an optical interface 232, a photosensor 242, and an analyzer device 262. The housing 202 can include a material capable of protecting the scintillator 222, the photosensor 242, the analyzer device 262, or a combination thereof, such as a metal, metal alloy, other material, or any combination thereof. The temperature sensor 204 is located adjacent to the scintillator 222, the photosensor 242, or both. The temperature sensor 204 can include a thermocouple, a thermistor, or another suitable device that is capable of determining the temperature within the housing over the normal operating temperature of the MWD device 20. A radiation detection apparatus includes the scintillator 222 that is optically coupled to the photosensor 242 that is coupled to the analyzer device 262.

In an embodiment, the scintillator can include an elpasolite scintillator compound having core valence luminescence. The elpasolite scintillator compound can include a dopant of a Group 2 element of the IUPAC Periodic Table of the version of Jan. 21, 2011. For example, the dopant can include Sr, Ca, Ba, Be, Mg, or a combination thereof. In a particular embodiment, the dopant can include Sr. In another particular embodiment, the dopant can include Ca or Ba. In a further particular embodiment, the dopant can include Mg.

In another embodiment, the elpasolite scintillator compound can have a stoichiometric or a non-stoichiometric composition. For example, the compound can have a general formula of $M^{1+}_3RE_{(1+s)}X_6$. $M^{1+}$ can be one or more monovalent metal elements; RE can be one or more rare earth elements; X can be one or more halide elements; and $-0.15 \leq s \leq +0.15$. In a particular embodiment, the elpasolite scintillator compound is stoichiometric when s=0. In another particular embodiment, the elpasolite scintillator compound is non-stoichiometric when s has a non-zero value.

In a further embodiment, the monovalent metal element can include Cs, Na, K, Rb, Li, or any combination thereof. In a particular embodiment, the monovalent element can include Cs. In yet another particular embodiment, the monovalent element can include Li. In a more particular embodiment, the elpasolite scintillator compound includes both Cs and Li. As used herein, Li can be naturally occurring Li, which includes about 8% of $^6Li$ and about 92% of $^7Li$. Alternatively, Li can be enriched with $^6Li$ so that $^6Li$ makes up more than 8% of the total Li content. For example, $^6Li$ makes up at least 70%, at least 80%, or at least 90% of the total Li content.

In another embodiment, the rare earth element can include Sc, Y, La, an element of the lanthanide series of elements, or a combination thereof. In a particular embodiment, the rare earth element can include La, Lu, Y, Ga, Yb, Ce, or any combination thereof. In a more particular embodiment, the rare earth element includes Y, La, Ce, or a combination thereof.

In yet another embodiment, the halide element can include F, Cl, Br, I, or a combination thereof. In a further embodiment, the halide element can include at least one atom of Cl. In a particular embodiment, the halide element only includes Cl. In yet another embodiment, the elpasolite scintillator compound includes more than one halide elements. For example, Cl and Br, Cl and I, or Cl, Br, and I can be present.

In a particular embodiment, the elpasolite scintillator compound can have a formula of $M^{1+}_3RE_{1+s}Cl_{(6-z)}X_z$. $M^{1+}$ can be one or more monovalent metal elements as described above; RE can be one or more rare earth elements as disclosed above; X can be one or more halide elements as disclosed above; z can be in a range of 0 to 5; and $-0.15 \leq s \leq +0.15$.

In another particular embodiment, the elpasolite scintillator compound can have a formula $Cs_2LiRE_{(1+s-x-y)}Ac_xD_yX_6$. RE can be one or more rare earth elements as disclosed above; Ac can be one or more activators as disclosed above; D can be the dopant of a Group 2 element as disclosed above; $0<x\leq0.2$; $0<y\leq0.2$; and $-0.15 \leq s \leq +0.15$. In a more particular embodiment, $0<x\leq0.1$. In another more particular embodiment, $0<y\leq0.1$ or $0<y\leq0.04$.

In another particular embodiment, the elpasolite scintillator compound can have a formula of $Cs_2LiRE_{(1+s-x-y)}Ce_xD_yCl_6$. D can be the dopant of a Group 2 element as disclosed above; RE can include Y, La, or Lu; x can be within any range disclosed above; y can be within any range disclosed above; and $-0.15 \leq s \leq +0.15$. In an even more particular embodiment, RE can be Y.

In another embodiment, the elpasolite scintillator compound can include an activator. The activator can include a rare earth element as disclosed above. Further, the activator can be a different rare earth element than that present in the formulas disclosed above. In a particular embodiment, the activator can include Ce, Pr, Tb, Eu, Sm, Nd, or a combination thereof. In a more particular embodiment, the activator can include Ce, Pr, or Tb. In an even more particular embodiment, the activator can include Ce.

In a further embodiment, the activator can have a content of at least 0.005 mol %. After reading this disclosure, a skilled artisan would understand that increasing the content of the activator may help to increase luminescence or improve decay time of the compound. For example, the content can be at least 0.01 mol %, at least 0.05 mol %, at least 0.1 mol %, or at least 0.5 mol %. In another embodiment, the content of the activator may be no greater than 20 mol %, which may help to maintain charge stability of the compound. For example, the content of the activator may be not greater than 15 mol %, not greater than 10 mol %, or not greater than 5 mol %. The content of the activator can be within a range between any of the minimum values and maximum values disclosed herein. For example, the content of the activator can be in a range of from 0.05 mol % to 10 mol % or 0.1 mol % to 5 mol %. The content of the activator as disclosed herein is determined per one mole of the elpasolite scintillator compound.

In a further embodiment, the dopant as described above can have a content of at least 0.005 mol % for the elpasolite scintillator compound to have stronger core valence luminescent compared to a corresponding elpasolite scintillator compound that does not include the Group 2 dopant. For example, the dopant content can be at least 0.007 mol %, at least 0.01 mol %, or at least 0.02 mol %. In another embodiment, the dopant may have a content of no greater than 1 mol %, not greater than 0.8 mol %, or not greater than 0.5 mol %, to help to maintain charge balance of the compound. The content of the dopant can be within a range of any of the minimum values and maximum values disclosed herein. For example, the content of the dopant can be within a range of 0.005 mol % to 2 mol %, 0.01 mol % to 1 mol %, or 0.1 mol % to 0.5 mol %. The content of the dopant as disclosed herein is determined per one mole of the elpasolite scintillator compound.

In still another embodiment, the elpasolite scintillator compound can further include a dopant that is not a Group 2 element. Such dopant can have a content of at least 0.005 mol %, at least 0.007 mol %, or at least 0.01 mol %. In another embodiment, the dopant may have a content of no greater than 1 mol %, not greater than 0.8 mol %, or not greater than 0.5 mol %. The content of such dopant can be within a range of any of the minimum values and maximum values disclosed herein. For example, the content of the dopant can be within a range of 0.005 mol % to 2 mol %, or 0.01 mol % to 1 mol %. In a further embodiment, such dopant can include a tetravalent element, which may help doping the elpasolite scintillator compound with a Group 2 element. For example, the presence of a tetravalent dopant can help to increase the content of the Group 2 dopant in the compound and maintain charge balance of the compound. The tetravalent dopant can include Zr, Sn, or Hf. In yet another embodiment, the elpasolite scintillator compound can include a dopant of a Group 1 element, a rare earth element, or a combination thereof. For example, the elpasolite scintillator compound can include a dopant including Na, Lu, or a combination thereof.

In an embodiment, the elpasolite scintillator compound disclosed herein can have core valence luminescence. For example, the elpasolite scintillator compound can be based on $Cs_2LiYCl_6$ (CLYC), $Cs_2LiLaCl_6$ (CLLC), $Cs_2LiYCl_{6-z}Br_z$ (z is in a range of 0 to 5), $Cs_2LiCeCl_6$ or $Cs_2LiLuCl_6$, and the activator and Group 2 dopant can be added to these compounds.

In a particular embodiment, exemplary elpasolite scintillator compound can include elpasolite scintillator compound having core valence luminescence and including the Group 2 dopant. In a more particular embodiment, the elpasolite scintillator compound can include $Cs_2LiYCl_6$:Ce (CLYC:Ce) doped with Sr, $Cs_2LiYCl_6$:Ce (CLYC:Ce) doped with Ca, $Cs_2LiYCl_6$:Ce (CLYC:Ce) doped with Ba, $Cs_2LiLaCl_6$:Ce (CLLC:Ce) doped with Sr, $Cs_2LiLaCl_6$:Ce (CLLC:Ce) doped with Ca, $Cs_2LiLaCl_6$:Ce (CLLC:Ce) doped with Ba, or any combination thereof.

In a further embodiment, the elpasolite scintillator compound including the Group 2 dopant as described above can have more core valence luminescence compared to a corresponding elpasolite scintillator compound at a lower temperature such as 25° C. or a higher temperature such as higher than 120° C. Stronger core valence luminescence can help to perform pulse shape discrimination with greater accuracy.

In a further embodiment, the elpasolite scintillator compound can have core valence luminescence at temperatures as high as 125° C. or higher. For example, temperature may be not lower than 130° C., not lower than 140° C., or even not lower than 150° C.

Returning to FIG. 2, the scintillator 222 and the photosensor 242 are optically coupled to the optical interface 232. The optical interface 232 can include a polymer, such as a silicone rubber, that is used to mitigate the refractive indices difference between the scintillator 222 and the photosensor 242. In other embodiments, the optical interface 232 can include gels or colloids that include polymers and additional elements.

The photosensor 242 can be a photomultiplier tube (PMT), a silicon photomultiplier (SiPM), a hybrid photosensor, or any combination thereof. The photosensor 242 can receive photons emitted by the scintillator 222 and produce electronic pulses based on numbers of photons that it receives. The photosensor 242 is electrically coupled to the analyzer device 262. Although not illustrated in FIG. 2, an amplifier may be used to amplify the electronic signal from the photosensor 242 before it reaches the analyzer device 262.

The analyzer device 262 can include hardware and can be at least partly implemented in software, firmware, or a combination thereof. In an embodiment, the hardware can include a plurality of circuits within an FPGA, an ASIC, another integrated circuit or on a printed circuit board, or another suitable device, or any combination thereof. The analyzer device 262 can also include a buffer to temporarily store data before the data are analyzed, written to storage, read, transmitted to another component or device, another suitable action is performed on the data, or any combination thereof. In the embodiment illustrated in FIG. 3, the analyzer device 262 can include an amplifier 422 coupled to the photosensor 242, such that an electronic pulse from the photosensor 242 can be amplified before analysis. The amplifier 222 can be coupled to an analog-to-digital converter (ADC) 424 that can digitize the electronic pulse. The ADC 424 can be coupled to a pulse shape discrimination (PSD) module 442.

Figure 3:
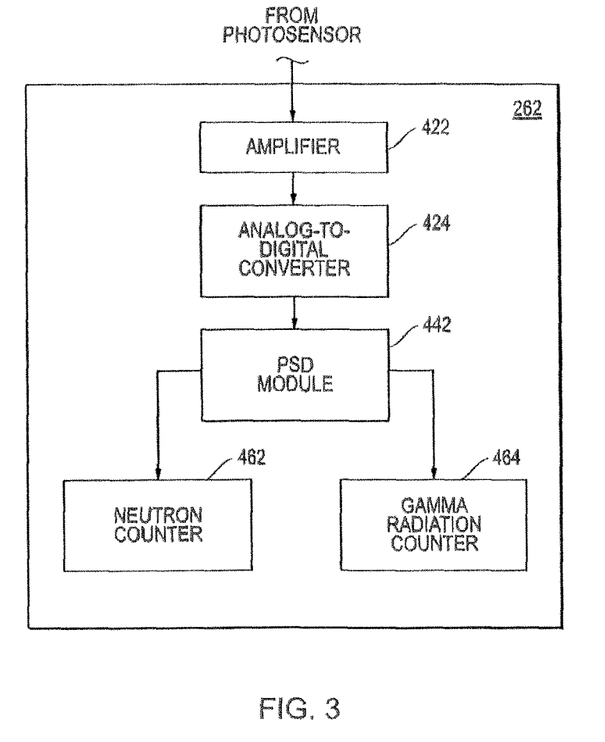
FIG. 3 includes a block diagram illustrating a particular embodiment of the analyzer device within the radiation detection apparatus of FIG. 2.

In a particular embodiment, the PSD module 442 can include a FPGA or an ASIC. In a particular embodiment, the PSD module 442 can include circuits to analyze the shape of the electronic pulse and determine whether the electronic pulse corresponds to a neutron or gamma radiation. The scintillator 222 has properties that make it well suited for using at high temperatures. The scintillator exhibits core valance luminescence at a temperature higher than 125° C. In an embodiment, the core valence luminescence can be detected at a temperature of 150° C., and possibly higher. Thus, the PSD module 442 can use a relatively simpler pulse discrimination technique and successfully discriminate between gamma radiation and neutrons before a relatively more complicated pulse discrimination technique would be used. An example of changing pulse discrimination techniques based on state information is described more fully in U.S. Application No. 61/945,438 filed Feb. 27, 2014, entitled "Radiation Detector, Processor Module, and Methods of Detecting Radiation and Well Logging", naming Kan Yang as an inventor, wherein such application is incorporated herein for its teachings of pulse discrimination techniques and classification of detected radiation.

In a more particular embodiment, the PSD module 442 can use the electronic pulse and temperature from the temperature sensor 204 with a look-up table to determine whether the electronic pulse corresponds to a neutron or gamma radiation. The look-up table can be part of the FPGA or ASIC or may be in another device, such as an integrated circuit, a disk drive, or a suitable persistent memory device.

The analyzer device 262 further comprises a neutron counter 462 and a gamma radiation counter 464. If the PSD module 442 determines that an electronic pulse corresponds to a neutron, the PSD module 442 increments the neutron counter 462. If the PSD module 442 determines that an electronic pulse corresponds to gamma radiation, the PSD module 442 increments the gamma radiation counter 464.

In an alternative embodiment, part or all of the components and functions provided by the analyzer device 262 can be located outside the well bore, either at the well drilling site or remote to the well drilling site, such as in an office building.

Figure 4:
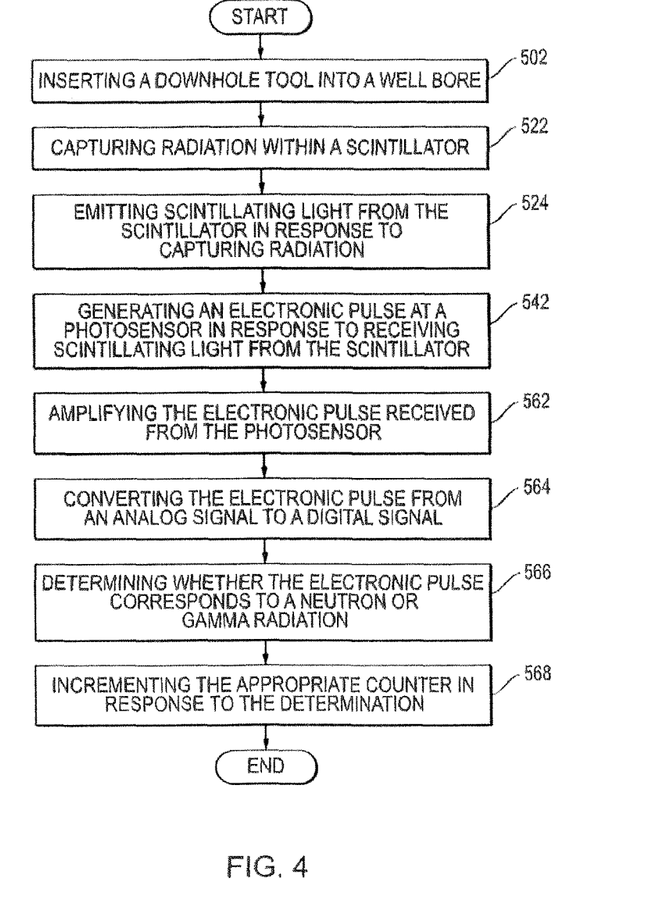
FIG. 4 includes a flow chart of a process of using the analyzer device of FIG. 2.

FIG. 4 includes a flowchart of an exemplary method of using the drilling apparatus as illustrated in FIG. 1 including the MWD device 20. The method will be described with respect to components within the drilling apparatus as illustrated in FIG. 1, the MWD device 262 as illustrated in FIG. 2, and the analyzer device as illustrated in FIG. 3. After reading this specification, skilled artisans will appreciate that activities described with respect to particular components may be performed by another component. Further, activities described with respect to particular components may be combined into a single component, and activities described with respect to a single component may be distributed between different components.

The method can begin with inserting the downhole tool into the well bore 16, at block 502 in FIG. 4. Referring to FIG. 1, the drill bit 26 can be activated by pumping mud down the drill string 14 to turn the downhole motor 24. For directional drilling, the orientation of the drill bit can be controlled using the top drive 12. When the direction of drilling is to continue along a straight line, the top drive 12 rotates drill string 14 while downforce pressure is exerted by the draw works 17. To change direction, the top drive 12 is used to position the tool face of the downhole tool. The downforce pressure may be reduced when the direction is being changed. After the toolface is in the correct position, the top drive 12 no longer rotates the drill string, as the bent section 23 causes the direction of drilling to change. The downforce pressure is increased on the bit 26 and drilling continues as the direction changes. After the proper direction is achieved, the top drive 12 is activated to rotate the drill string 14 so that further drilling continues in the new direction. During drilling significant heat can be generated, and the resulting temperature can be greater than 120° C., at least 130° C., at least 140° C., at least 150° C., or even higher. Also during, drilling data is collected by the MWD device 20. The scintillator 222 is selected so that at such temperatures, the scintillator 222 can generate different scintillating light corresponding to different types of radiation that is converted by the photosensor 242 into different types of electronic pulses depending on the type of radiation captured.

The method can include capturing radiation and emitting scintillating light, at blocks 522 and 524 in FIG. 4. The radiation can be captured by the scintillator 222, and the scintillating light can be emitted by the scintillator 222 in response to capturing the radiation. The method can further include generating an electronic pulse at the photosensor 242 in response to receiving scintillating light from the scintillator 222, at block 542. The electronic pulse can be provided by the photosensor 242 to the analyzer device 262. The method can further include amplifying the electronic pulse, at block 562. The electronic signal may be amplified by a pre-amplifier or an amplifier within the photosensor 242 or the analyzer device 262. The method can also include converting the electronic pulse from an analog signal to a digital signal, at block 564.

The method can include determining whether electronic pulse corresponds to a neutron or gamma radiation, at block 566 in FIG. 4. In an embodiment, determination can be performed by an FPGA, an ASIC, or another suitable device. Analysis of the pulse can include determining a rise time of the pulse, a decay time, another suitable parameter that can be useful in making the determination, or any combination thereof. The determination can be performed using the PSD module 442. The PSD module 442 may use temperature information from the temperature sensor 204 to determine which pulse discrimination technique should be used. The selected pulse discrimination technique can be used to analyze the pulse to determine if the pulse corresponds to a neutron or gamma radiation. The method can further include incrementing the appropriate counter in response to the determination, at block 568. When the electronic pulse is determined to correspond to a neutron, the neutron counter 462 is incremented. When the electronic pulse is determined to correspond to gamma radiation, the gamma radiation counter 464 is incremented.

Referring to FIG. 4, some of the actions described with respect to blocks 562, 564, 566, and 568 can be performed by the analyzer device 262. All of the analyzer device 262 may be within the MWD device 20 or may be outside the well bore 16. In another embodiment, the amplifier 422 and ADC 424 may be within the MWD device 20, and the PSD module 442 and counters 462 and 464 may be located at the surface outside the well bore 16. After reading this specification, skilled artisans will be able to determine where the analyzer device or components of the analyzer device 262 are to be located in view of the normal operating temperatures, computational needs that may or may not depend on the composition of the scintillator, and the particular application.

While the radiation detection apparatus is described with respect to a drilling apparatus, the radiation detection apparatus can be part of a well logging apparatus that does not perform a drilling operation. Similar to the downhole tool with the drill bit 26, the well logging apparatus can include a downhole tool without the drill bit. A flexible string may be coupled to the downhole tool to allow the downhole tool to lowered and raised within the well bore 16. If needed or desired a drill string may be coupled to the downhole tool.

The scintillator and the analyzer disclosed herein can also be used as a part of a radiation detection apparatus that can be used at port entry. The scintillator and the analyzer can operate over a wide range of temperature, such as from −40° C. to 180° C.

The concepts as described herein can be used to produce a scintillator that has improved core valance luminescence at room temperature and significant core valence luminescence at a higher temperature than a corresponding elpasolite scintillator compound. In a particular embodiment, the scintillator can be an elpasolite scintillator compound including a dopant that is a Group 2 element and may or may not further include an activator. The scintillator as described herein can allow for easier discrimination between neutrons and gamma radiation, and therefore, a relatively simpler discrimination technique may be used, even at higher temperatures where core valence luminescence in the corresponding elpasolite scintillator compound can no longer use the relatively simpler pulse discrimination technique. The concepts described herein may be extended to other types of radiation, such as x-rays, alpha particles, beta particles, etc. and are not limited to neutrons and gamma radiation.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa. Embodiments may be in accordance with any one or more of the embodiments as listed below.

Embodiment 1

A scintillator including an elpasolite scintillator compound including a first dopant that is a Group 2 element, wherein the elpasolite scintillator compound has more core valance luminescence than a corresponding elpasolite scintillator compound without the first dopant.

Embodiment 2

The scintillator of Embodiment 1, wherein the elpasolite scintillator compound further comprises a rare earth element.

Embodiment 3

The scintillator of Embodiment 2, wherein the elpasolite scintillator compound further comprises an activator that is different from the rare earth element.

Embodiment 4

The scintillator of Embodiment 3, wherein the first dopant includes Sr.

Embodiment 5

The scintillator of Embodiment 3, wherein the first dopant includes Ca or Ba.

Embodiment 6

The scintillator of Embodiment 3, wherein the elpasolite scintillator has a formula of $Cs_2LiRE_{(1+s-x-y)}Ce_xD^{1st}_yCl_6$, wherein RE includes Y, La, Ce, or Lu; $D^{1st}$ is the first dopant; $-0.15 \leq s \leq +0.15$; $0 < x \leq 0.2$; and $0 < y \leq 0.2$.

Embodiment 7

The scintillator of Embodiment 6, wherein $D^{1st}$ is Sr.

Embodiment 8

The scintillator of Embodiment 3, wherein the activator includes Ce, Pr, or Tb.

Embodiment 9

The scintillator of Embodiment 1, wherein the elpasolite scintillator has a general formula of: $M^{1+}_3RE_{(1+s)}Cl_{(6-z)}X_z$, wherein, $M^{1+}$ is at least one monovalent metal element, RE is at least one rare earth element, $-0.15 \leq s \leq +0.15$, X is at least one halide, and z is 0 to 5.

Embodiment 10

The scintillator of Embodiment 9, wherein X includes a halide that is different from Cl.

Embodiment 11

The scintillator of Embodiment 9, wherein the scintillator includes naturally occurring Li.

Embodiment 12

The scintillator of Embodiment 9, wherein the scintillator includes Li enriched with $^6Li$.

Embodiment 13

The scintillator of Embodiment 1, wherein the scintillator further comprises a second dopant that is a tetravalent metal atom.

Embodiment 14

The scintillator of Embodiment 1, wherein a concentration of the first dopant is in a range of $5 \times 10^{-3}$ mol % to 0.5 mol %.

Embodiment 15

A scintillator including an elpasolite scintillator compound having significant core valence luminescence at a temperature higher than 125° C.

Embodiment 16

A radiation detection apparatus comprising a scintillator including an elpasolite scintillator compound including at least one chlorine atom and a first dopant that is a Group 2 element; and a photosensor optically coupled to the scintillator.

Embodiment 17

The apparatus of Embodiment 16, wherein the scintillator comprises $Cs_2LiRE_{(1+s-x-y)}Ac_xD^{1st}_yCl_{(6-z)}X_z$, wherein RE is a rare earth element other than the activator; Ac is the activator including Ce, Pr, or Tb; $D^{1st}$ is the first co-dopant that is a Group 2 element; X is at least one halide; −0.15<s<+0.15; 0<x≤0.2; 0<y≤0.2; and 0≤z≤5.

Embodiment 18

The radiation detection apparatus of Embodiment 17, further comprising an analyzer unit configured to discriminate between gamma radiation and neutrons.

Embodiment 19

The radiation detection apparatus of Embodiment 16, wherein the analyzer unit is analyzer unit configured to discriminate between gamma radiation and neutrons at a temperature in a range of −40° C. to 180° C.

Embodiment 20

The radiation detection apparatus of Embodiment 16, wherein the radiation detection apparatus is part of a downhole tool configured to be inserted into a well bore.

EXAMPLE

The Example is given by way of illustration only and do not limit the scope of the present invention as defined in the appended claims. The Example demonstrates improved scintillator performance and pulse discrimination when an elpasolite scintillator is doped with a Group 2 element.

Figure 5:
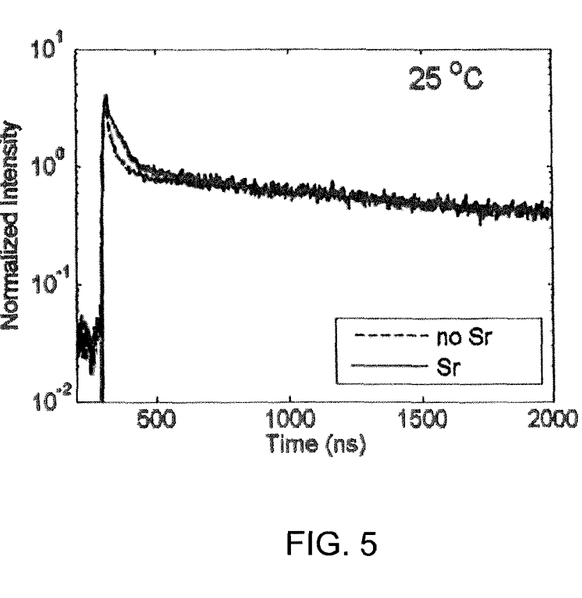
FIG. 5 includes plots of normalized intensity at room temperature for elpasolite compounds with and without a Group 2 dopant.

Data was collected on a scintillator compound with and without a Group 2 dopant. The scintillators included $Cs_2LiY_{0.98}Ce_{0.02}Cl_6$ (CLYC:Ce) and $Cs_2LiY_{0.968}Ce_{0.02}Sr_{0.012}Cl_6$ (CLYC:Ce; Sr). FIG. 5 includes normalized intensity of an electronic pulse generated at 25° C. in response to capturing gamma radiation. CLYC:Ce; Sr has a more intense peak as compared to CLYC:Ce. Thus, at 25° C. (room temperature), CLYC:Ce; Sr has improved core valence luminescence as compared to CLYC:Ce.

The scintillators were exposed to $^{252}Cf$ having a mass of approximately 109 nanograms and placed about 30 cm from the scintillator. The exposure was performed at 125° C. and 150° C. Radiation captured by the scintillators caused scintillating light to be emitted that was collected by a photosensor, which in turn generated an electronic pulse. A fast Fourier transform (FFT) can be performed on a portion of the pulses where the distinction between the different types of radiation is believed to be the greatest.

Figure 6:
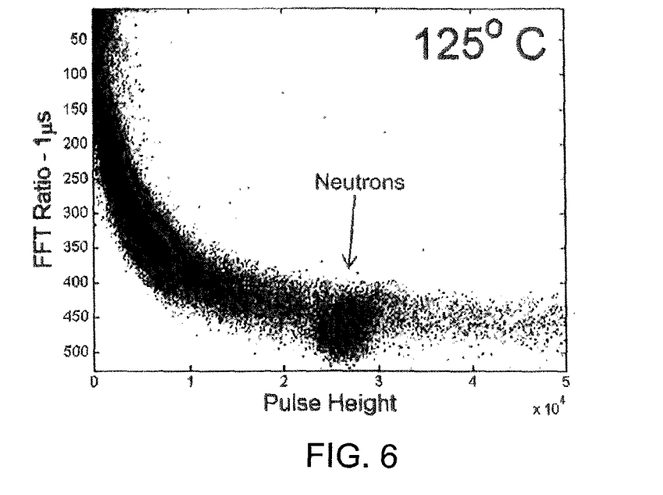
FIGS. 6 and 7 include plots of Fast Fourier Transform ratio as a function of pulse height when elpasolite scintillator compounds with and without a Group 2 dopant are at 125° C. and exposed to a $^{252}$Cf radiation source.
Figure 7:
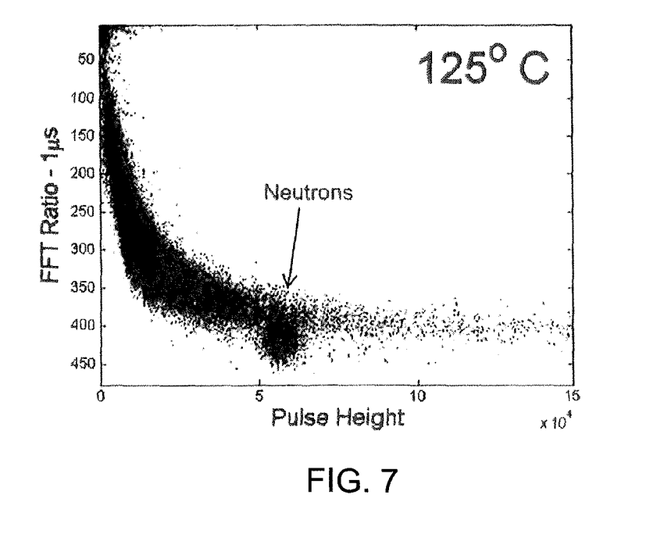

The plots as illustrated in FIGS. 6 and 7 include the FFT ratio for CLYC:Ce and CLYC:Ce; Sr, respectively when the scintillator is at 125° C. Gamma radiation are the data that extend from the upper left-hand corner and curves toward the lower right-hand corner. For CLYC:Ce, FIG. 6 illustrates that neutrons substantially overlap the portion that corresponds to gamma radiation. For CLYC:Ce; Sr, FIG. 7 illustrates that neutrons are almost completely outside the portion that corresponds to gamma radiation. Neutrons can be more readily discerned from gamma radiation for CLYC:Ce; Sr as compared to CLYC:Ce. At 125° C., CLYC:Ce is at the limit of the analyzer module's ability to discrimination between neutrons and gamma radiation using a relatively simple pulse discrimination technique.

Figure 8:
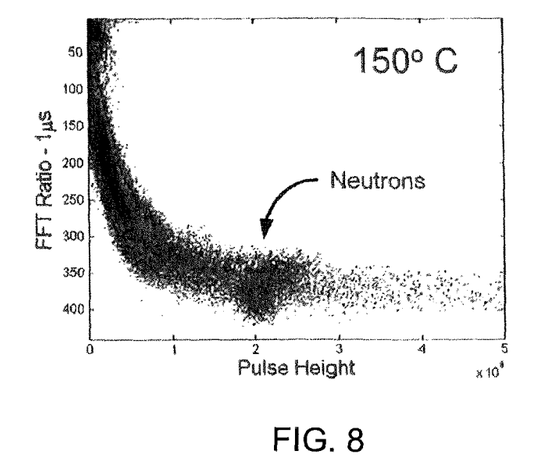
FIGS. 8 and 9 include plots of Fast Fourier Transform ratio as a function of pulse height when elpasolite scintillator compounds with and without a Group 2 dopant are at 150° C. and exposed to a $^{252}$Cf radiation source.
Figure 9:
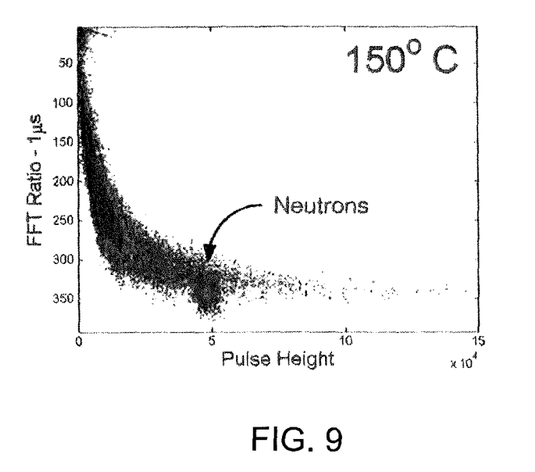

The plots as illustrated in FIGS. 8 and 9 include the FFT ratio for CLYC:Ce and CLYC:Ce; Sr, respectively when the scintillator is at 150° C. For CLYC:Ce, FIG. 8 illustrates that neutrons is almost entirely within the portion that corresponds to gamma radiation. Thus, the analyzer module cannot use a relatively simple pulse discrimination technique for discriminating between neutrons and gamma radiation. A more complicated pulse discrimination technique will be needed to discriminate between neutrons and gamma radiation. For CLYC:Ce; Sr. FIG. 9 illustrates that neutrons significantly overlap the portion that corresponds to gamma radiation. Unlike CLYC:Ce, the analyzer module can still use a relatively simple pulse discrimination technique to discriminate between neutrons and gamma radiation for CLYC:Ce; Sr.

Accordingly, a scintillator that is an elpasolite scintillator with core valence luminescence can be operated at a temperature higher than 125° C. and up to 150° C., possibly higher and still allow an analyzer module to use a relatively simple pulse discrimination technique to discriminate accurately between neutrons and gamma radiation.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator including an elpasolite scintillator compound including a first dopant that is a Group 2 element, wherein:
the elpasolite scintillator compound has more core valance luminescence than a corresponding elpasolite scintillator compound without the first dopant; and
the elpasolite scintillator compound has a formula $Cs_2LiRE_{(1+s-x-y)}Ac_xD^{1st}_yCl_{(6-z)}X_z$,
wherein:
RE includes a rare earth element other than an activator;
Ac is the activator including Ce, Pr, or Tb;
$D^{1st}$ is the first dopant;

X includes a halogen that is different from Cl;
$-0.15 < s < +0.15$;
$0 < x \le 0.2$;
$0 < y \le 0.2$; and
$0 \le z \le 5$.

2. The scintillator of claim 1, wherein the first dopant includes Sr.

3. The scintillator of claim 1, wherein the first dopant includes Ca or Ba.

4. The scintillator of claim 1, wherein z is 0, and the formula is:

$$Cs_2LiRE_{(1+s-x-y)}Ce_xD^{1st}_yCl_6$$

wherein:
RE includes the rare earth element including Y, La, Ce, or Lu.

5. The scintillator of claim 1, wherein $D^{1st}$ is Sr.

6. The scintillator of claim 1, wherein the activator includes Ce, Pr, or Tb.

7. The scintillator of claim 1, wherein the scintillator includes naturally occurring Li.

8. The scintillator of claim 1, wherein the scintillator includes Li enriched with $^6$Li.

9. The scintillator of claim 1, wherein the scintillator further comprises a second dopant that is a tetravalent metal atom.

10. The scintillator of claim 1, wherein a concentration of the first dopant is in a range of $5 \times 10^{-3}$ mol % to 0.5 mol %.

11. A radiation detection apparatus comprising:
a scintillator including an elpasolite scintillator compound including at least one chlorine atom and a first dopant that is a Group 2 element; and
a photosensor optically coupled to the scintillator,
wherein:
the scintillator comprises $Cs_2LiRE_{(1+s-x-y)}Ac_xD^{1st}_yCl_{(6-z)}X_z$, wherein:
RE is a rare earth element other than an activator;
Ac is the activator including Ce, Pr, or Tb;
$D^{1st}$ is the first dopant that is a Group 2 element;
X is at least one halogen;
$-0.15 < s < +0.15$;
$0 < x \le 0.2$;
$0 < y \le 0.2$; and
$0 \le z \le 5$; and
the radiation detection apparatus is part of a downhole tool configured to be inserted into a well bore.

12. The radiation detection apparatus of claim 11, further comprising an analyzer unit configured to discriminate between gamma radiation and neutrons.

13. The radiation detection apparatus of claim 12, wherein the analyzer unit is configured to discriminate between gamma radiation and neutrons at a temperature in a range of $-40°$ C. to $180°$ C.

14. The radiation detection apparatus of claim 11, wherein the first dopant includes Sr, Ca, or Ba.

* * * * *

UNITED STATES PATENT AND TRADEMARK OFFICE
CERTIFICATE OF CORRECTION

PATENT NO. : 9,733,386 B2
APPLICATION NO. : 14/885784
DATED : August 15, 2017
INVENTOR(S) : Kan Yang et al.

Page 1 of 1

It is certified that error appears in the above-identified patent and that said Letters Patent is hereby corrected as shown below:

In the Claims

Claim 1, Column 13, Line 1, "CI" should read --Cl--.

Signed and Sealed this
Seventeenth Day of September, 2019

Andrei Iancu
*Director of the United States Patent and Trademark Office*